US011526722B2

(12) United States Patent
Shibahara et al.

(10) Patent No.: US 11,526,722 B2
(45) Date of Patent: Dec. 13, 2022

(54) DATA ANALYSIS APPARATUS, DATA ANALYSIS METHOD, AND DATA ANALYSIS PROGRAM

(71) Applicant: HITACHI, LTD., Tokyo (JP)

(72) Inventors: Takuma Shibahara, Tokyo (JP); Mayumi Suzuki, Tokyo (JP); Ken Naono, Tokyo (JP)

(73) Assignee: HITACHI, LTD., Tokyo (JP)

(*) Notice: Subject to any disclaimer, the term of this patent is extended or adjusted under 35 U.S.C. 154(b) by 1031 days.

(21) Appl. No.: 16/117,260

(22) Filed: Aug. 30, 2018

(65) Prior Publication Data

US 2019/0122097 A1   Apr. 25, 2019

(30) Foreign Application Priority Data

Oct. 25, 2017  (JP) .............................. JP2017-206069

(51) Int. Cl.
*G06N 3/04* (2006.01)
*G06N 3/08* (2006.01)

(52) U.S. Cl.
CPC ................. *G06N 3/04* (2013.01); *G06N 3/08* (2013.01)

(58) Field of Classification Search
CPC .................................... G06N 3/04; G06N 3/08
See application file for complete search history.

(56) References Cited

U.S. PATENT DOCUMENTS

| 10,140,544 | B1* | 11/2018 | Zhao | G06V 10/454 |
| 2010/0063774 | A1* | 3/2010 | Cook | G05B 15/02 |
| | | | | 702/181 |
| 2016/0125289 | A1* | 5/2016 | Amir | G06N 3/049 |
| | | | | 706/27 |
| 2017/0011280 | A1* | 1/2017 | Soldevila | G06K 9/6214 |
| 2018/0039856 | A1* | 2/2018 | Hara | G06N 3/0472 |

OTHER PUBLICATIONS

Pareek, V. K., et al. "Artificial neural network modeling of a multiphase photodegradation system." Journal of Photochemistry and Photobiology A: Chemistry 149.1-3 (2002): 139-146. (Year: 2002).*

Meyer, Maria Ines, et al. "A deep neural network for vessel segmentation of scanning laser ophthalmoscopy images." International Conference Image Analysis and Recognition. Springer, Cham, 2017. (Year: 2017).*

Marco Tulio Ribeiro et al.,"Why Should I Trust You? Explaining the Predictions of Any Classifier" 2016 ACM, ISBN 978-1-4503-4232-2/16/08.

Trevor Hastie, Robert Tibshirani and Jerome Friedman, "The Elements of Statistical Learning Data Mining, Inference, and Prediction" Second Edition, Springer Series in Statistics, 2001.

* cited by examiner

*Primary Examiner* — Li B. Zhen
*Assistant Examiner* — Moriam Mosunmola Godo
(74) *Attorney, Agent, or Firm* — Baker Botts L.L.P.

(57) ABSTRACT

Facilitation of an explanation about an object to be analyzed is realized with high accuracy and with efficiency.
A data analysis apparatus is disclosed which uses a first neural network configured with an input layer, an output layer, and two or more intermediate layers provided between the input layer and the output layer. Each performs a calculation by giving data from a layer of a previous stage and a first learning parameter to a first activation function and outputs a calculation result to a layer of a subsequent stage. The data analysis apparatus includes a conversion section; a reallocation section; and an importance calculation section.

6 Claims, 9 Drawing Sheets

|  | Attribute | Information |
|---|---|---|
|  | (1) CRIM | per capita crime rate by town |
|  | (2) ZN | proportion of residential land zoned for lots over 25,000 square feet |
|  | (3) INDUS | proportion of non-retail business acres per town |
|  | (4) CHAS | Charles River dummy variable (= 1 if tract bounds river; 0 otherwise) |
|  | (5) NOX | nitric oxides concentration (parts per 10 million) |
|  | (6) RM | average number of rooms per dwelling |
| Features | (7) AGE | proportion of owner-occupied units built prior to 1940 |
|  | (8) DIS | weighted distances to five Boston employment centers |
|  | (9) RAD | index of accessibility to radial highways |
|  | (10) TAX | full-value property-tax rate per $10,000 |
|  | (11) PTRATIO | pupil-teacher ratio by town |
|  | (12) B | 1000(Bk - 0.63)^2 where Bk is the proportion of blacks by town |
|  | LSTAT | % lower status of the population |
| Target | MEDV | Median value of owner-occupied homes in $1000's |

FIG. 9

DATA ANALYSIS APPARATUS, DATA ANALYSIS METHOD, AND DATA ANALYSIS PROGRAM

CLAIM OF PRIORITY

The present application claims priority from Japanese patent application JP 2017-206069 filed on Oct. 25, 2017, the content of which is hereby incorporated by reference into this application.

TECHNICAL FIELD

The present invention relates to a data analysis apparatus, a data analysis method, and a data analysis program.

BACKGROUND ART

As an approach for predicting output data from input data, there is known an approach called perceptron. The perceptron outputs a predicted value from a computation result of linear combination between feature vectors that are inputs and weight vectors. A neural network is also called multi-layer perceptron, which is a technique that allows for a capability of solving a linearly inseparable problem by superimposing a plurality of perceptrons, and which emerged in the 1980s. Since around 2012, a neural network that introduced new technologies such as dropout has been called deep learning.

In the field of machine learning, to calculate learning parameters (weight vectors and the like in the perceptron) in such a manner that an error between a predicted value obtained from feature vectors and an actual value (true value) becomes a minimum value is called learning. Upon completion with a learning process, a new predicted value can be calculated from data not used in learning (hereinafter, referred to as "test data"). In the perceptron, a magnitude of each element value of weight vectors is used as an importance of a factor contributing to a prediction.

On the other hand, in the neural networks including the deep learning, each element of feature vectors is subjected to weighted product-sum operation with other elements whenever passing through a perceptron; thus, in principle, it is difficult to grasp the importance of a single element.

An approach of Non-Patent Document 1 is one for causing linear regression to be learned anew so that a discrimination result of a machine learning approach such as the deep learning that does not have a function to calculate importances of features is explainable. Furthermore, logistic regression is a machine learning model equivalent to the perceptron and most widely used in every field. For example, the logistic regression illustrated in Non-Patent Document 2, page 119 has a function to calculate the importances of features for entire data samples.

PRIOR ART DOCUMENT

Non-Patent Document

Non-Patent Document 1: Ribeiro, Marco Tulio, Sameer Singh, and Carlos Guestrin. "Why should I trust you?: Explaining the predictions of any classifier." Proceedings of the 22nd ACM SIGKDD International Conference on Knowledge Discovery and Data Mining. ACM, 2016.
Non-Patent Document 2: Friedman J, Trevor H. Robert T. The elements of statistical learning. second edition. New York: Springer series in statistics, 2001.

SUMMARY OF THE INVENTION

Problem to be Solved by the Invention

The approach of Non-Patent Document 1 merely tries to give an explanation afterwards by the linear regression and does not mathematically guarantee that the importances of features used at a time of the prediction by the deep learning can be completely calculated. Furthermore, if the linear regression can completely achieve identical prediction accuracy to that of the deep learning, then the initial deep learning is no longer necessary, and a configuration and a concept of the approach are contradictory. Moreover, the logistic regression does not have a function to calculate the importances of the features for individual data samples.

The present invention has been achieved in the light of the foregoing and an object of the present invention is to realize facilitating an explanation about an object to be analyzed with high accuracy and with efficiency.

Means for Solving the Problems

A data analysis apparatus according to one aspect of the invention disclosed in the present application is a data analysis apparatus using a first neural network configured with an input layer, an output layer, and two or more intermediate layers which are provided between the input layer and the output layer and each of which performs calculation by giving data from a layer of a previous stage and a first learning parameter to a first activation function and outputs a calculation result to a layer of a subsequent stage, the data analysis apparatus including: a conversion section that converts a number of dimensions of output data from each of the intermediate layers into a number of dimensions of the same size on the basis of the output data and a second learning parameter and outputs respective output data after conversion; a reallocation section that reallocates first input data in a first feature space given to the input layer to a second feature space on the basis of the output data after conversion from the conversion section and the first input data in the first feature space; and an importance calculation section that calculates a first importance of the first input data in each of the intermediate layers on the basis of the respective output data after conversion and a third learning parameter.

Effect of the Invention

According to a representative embodiment of the present invention, facilitation of an explanation about an object to be analyzed can be realized with high accuracy and with efficiency. Objects, configurations, and effects other than those mentioned above will be readily apparent from the description of embodiments given below.

MODES FOR CARRYING OUT THE INVENTION

First Embodiment

<Example of Reallocation of Feature Vectors>

AI (Artificial Intelligence) has a capability to solve a linearly inseparable problem; however, it is unclear why the AI made such a decision. A machine learning approach such as deep learning, in particular, is high in prediction accuracy but low in explainability. For example, in a case in which the AI outputs a diagnosis result that "prone to catch a cold" to a certain patient, a doctor is unable to answer a question of why the AI obtained such a result. If the AI can determine a cause of the result, the doctor can give proper treatment to the patient.

Figure 1:
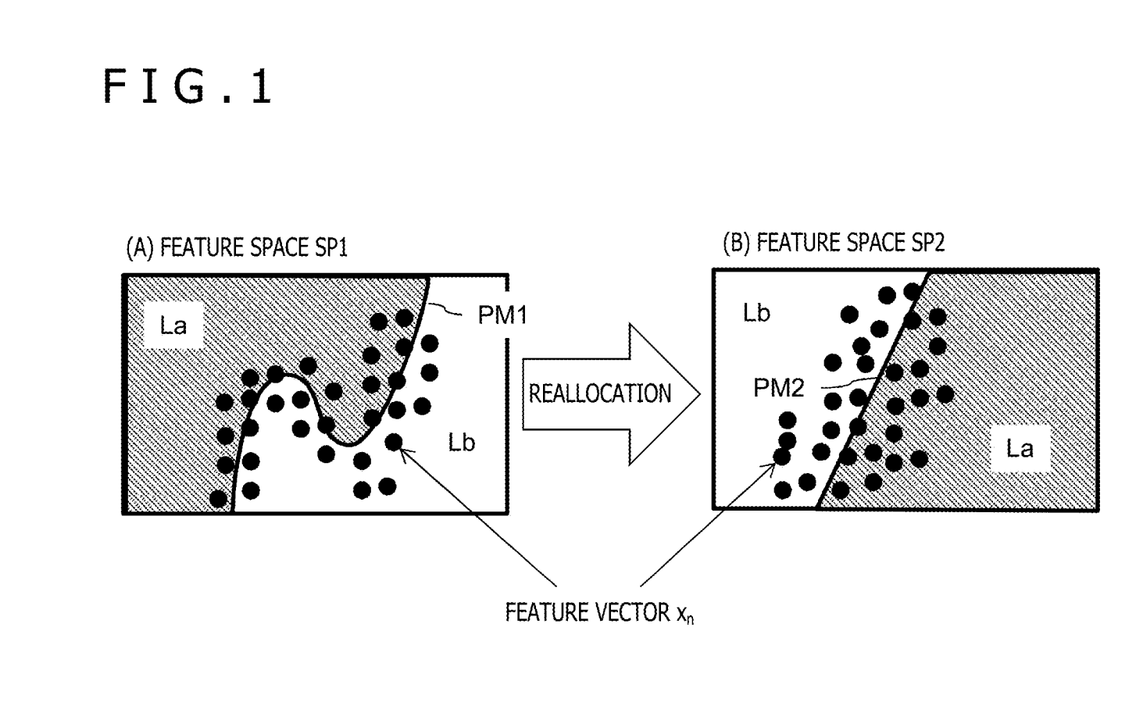
FIG. 1 is an explanatory diagram illustrating an example of reallocation of feature vectors.

FIG. 1 is an explanatory diagram illustrating an example of reallocation of feature vectors. In (A), in a feature space SP1, a plurality of feature vectors $x_n$ (n=1, 2, ..., N, where N is the number of images) are present. The plurality of feature vectors $x_n$ are discriminated as correct labels La and Lb by, for example, a nonlinear prediction model PM1. In (B), in a feature space SP2, a plurality of feature vectors $x_n$ are present. The plurality of feature vectors $x_n$ are discriminated as correct labels La and Lb by, for example, a linear prediction model PM2.

In (A), the machine learning approach such as the deep learning learns linear regression anew for explaining the prediction model PM1 that is a discrimination result. Specifically, for example, this machine learning approach executes a retrofitted process of determining the prediction model PM1 and then locally performing straight-line approximation on the prediction model PM1. However, it is unclear in such a retrofitted process whether a straight-line approximated local part of the prediction model PM1 can correctly explain the feature vectors $x_n$. Furthermore and more importantly, executing logistic regression called straight-line approximation makes it necessary to execute machine learning twice after all.

Since the prediction model PM2 in (B) is linear, referring to an inclination of the prediction model PM2 makes it possible to grasp with which parameter in the feature space SP2 each of the feature vectors $x_n$ is weighted and to correctly explain the feature vector $x_n$. In a first embodiment, the plurality of feature vectors $x_n$ in the feature space SP1 are reallocated to the other feature space SP2 without determining the nonlinear prediction model PM1 like (A) for the plurality of feature vectors $x_n$. The linear prediction model PM2 is thereby obtained; thus, it is possible to grasp with which parameter in the feature space SP2 each of the feature vectors $x_n$ is weighted and to correctly explain each feature vector $x_n$ in response to an importance of the parameter.

In other words, a user can grasp which factor (feature) included in the features $x_n$ contributes to a prediction result for every sample (for example, for every patient) having the feature vectors $x_n$; thus, it is easy to explain why such a prediction result is obtained. Therefore, it is possible to improve explainability of the machine learning. According to the above example, the user can grasp why the AI outputted the diagnosis result of "prone to catch a cold" to the certain patient. Furthermore, it is possible to improve efficiency of the machine learning since it is unnecessary to execute the machine learning twice unlike (A). Therefore, it is possible to promptly provide an explanation described above.

<Example of System Configuration>

Figure 2:
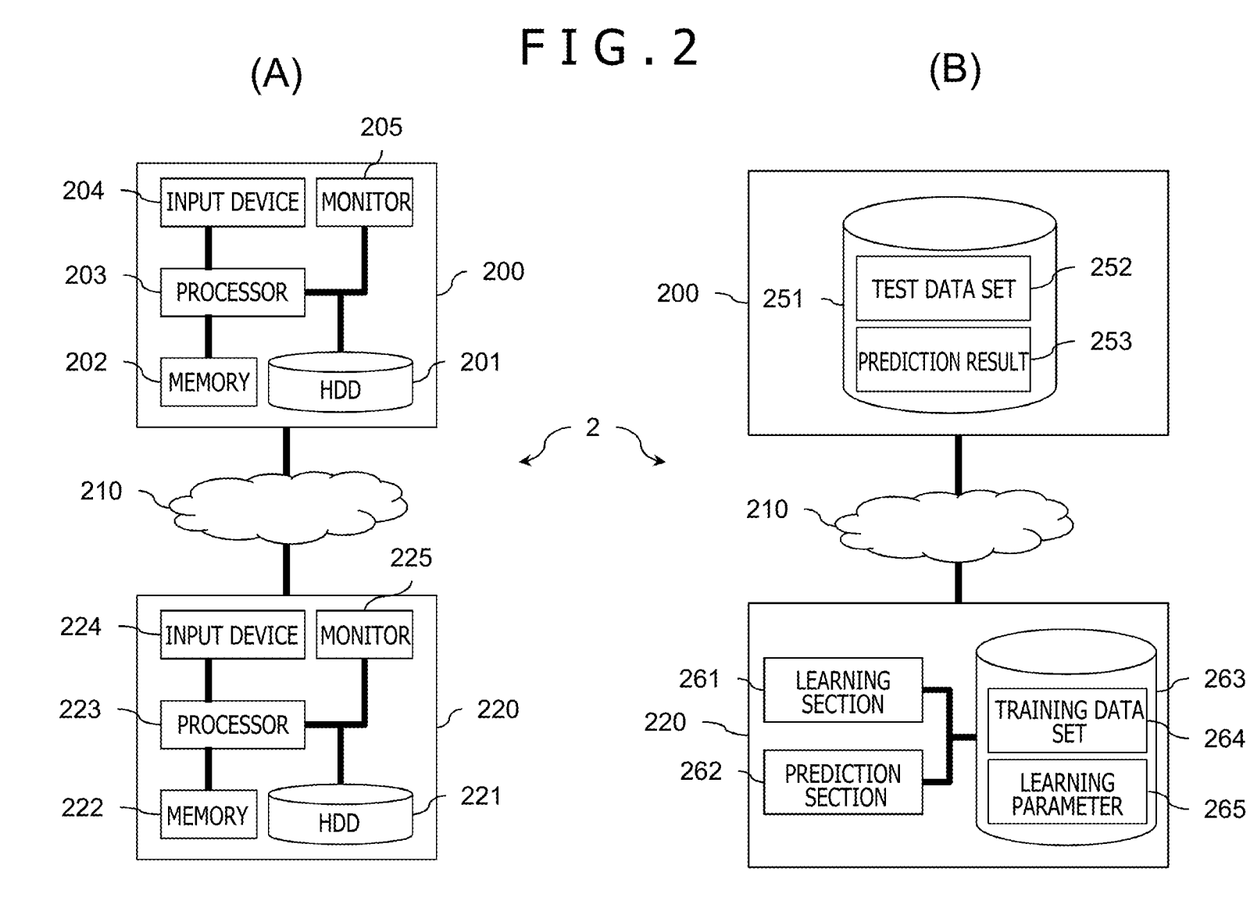
FIG. 2 is a block diagram illustrating an example of a configuration of a data analysis system.

FIG. 2 is a block diagram illustrating an example of a configuration of a data analysis system. While a server-client type data analysis system 2 will be taken by way of example in FIG. 2, the data analysis system may be a stand-alone type. (A) is a block diagram illustrating an example of a hardware configuration of the data analysis system 2, and (B) is a block diagram illustrating an example of a functional configuration of the data analysis system 2. In (A) and (B), the same configuration is denoted by the same reference character.

The data analysis system 2 is configured such that a client terminal 200 and a data analysis apparatus 220 that is a server is communicably connected to each other by a network 210.

In (A), the client terminal 200 has an HDD (hard disk drive) 201 that is an auxiliary storage device, a memory 202 that is a main storage device, a processor 203, an input device 204 that is a keyboard and a mouse, and a monitor 205. The data analysis apparatus 220 has an HDD 221 that is an auxiliary storage device, a memory 222 that is a main storage device, a processor 223, an input device 224 that is a keyboard and a mouse, and a monitor 225. It is noted that the main storage device, the auxiliary storage device, and a transportable storage medium, which is not shown, will be generically referred to as "memory devices." The memory devices each store a first neural network 300 and learning parameters of the first neural network 300.

In (B), the client terminal 200 has a client database (DB) 251. The client DB 251 is stored in the memory device such as the HDD 201 or the memory 202. The client DB 251 stores a test data set 252 and a prediction result 253. The test data set 252 is a set of test data. The prediction result 253 is data obtained from a prediction section 262 via the network 210. It is noted that one or more client terminals 200 are present in the case of the server-client type.

The data analysis apparatus 220 has a learning section 261, the prediction section 262, and a server database (DB) 263. The learning section 261 is a functional section that executes a process illustrated in FIGS. 1 and 2 and that outputs learning parameters 265.

The prediction section 262 is a functional section that constructs a first neural network 300 using the learning parameters 265, that executes a prediction process by applying the test data to the first neural network 300, and that outputs the prediction result 253 to the client terminal 200. The learning section 261 and the prediction section 262 realize functions thereof by causing the processor 223 to execute a program stored in the memory device such as the HDD 221 and the memory 222.

The server DB 263 stores a training data set 264 and the learning parameters 265. The training data set 264 includes images $x_n$ that are an example of the feature vectors and correct labels $t_n$. The learning parameters 265 are output data from the learning section 261 and include matrices $W^l_D$, $W^l_R$, $W^l_E$, and $W^l_A$, and a weight vector $w_O$. It is noted that the neural network to which the learning parameters are set will be referred to as "prediction model."

It is noted that the data analysis apparatuses 220 may be configured with a plurality of data analysis apparatuses. For example, a plurality of data analysis apparatuses 220 may be present for load distribution. Furthermore, the data analysis apparatus 220 may be configured with a plurality of parts according to functions. For example, the data analysis apparatus 220 may be configured with a first server that includes the learning section 261 and the server DB 263 and a second server that includes the prediction section 262 and the server DB 263. Alternatively, the data analysis apparatus 220 may be configured with a first data analysis apparatus that includes the learning section 261 and the prediction section 262 and a second data analysis apparatus that includes the server DB 263. In another alternative, the data analysis apparatus 220 may be configured with a first server that includes the learning section 261, a second data analysis apparatus that includes the prediction section 262, and a third data analysis apparatus that includes the server DB 263.

<Example of Structure of Neural Network>

Figure 3:
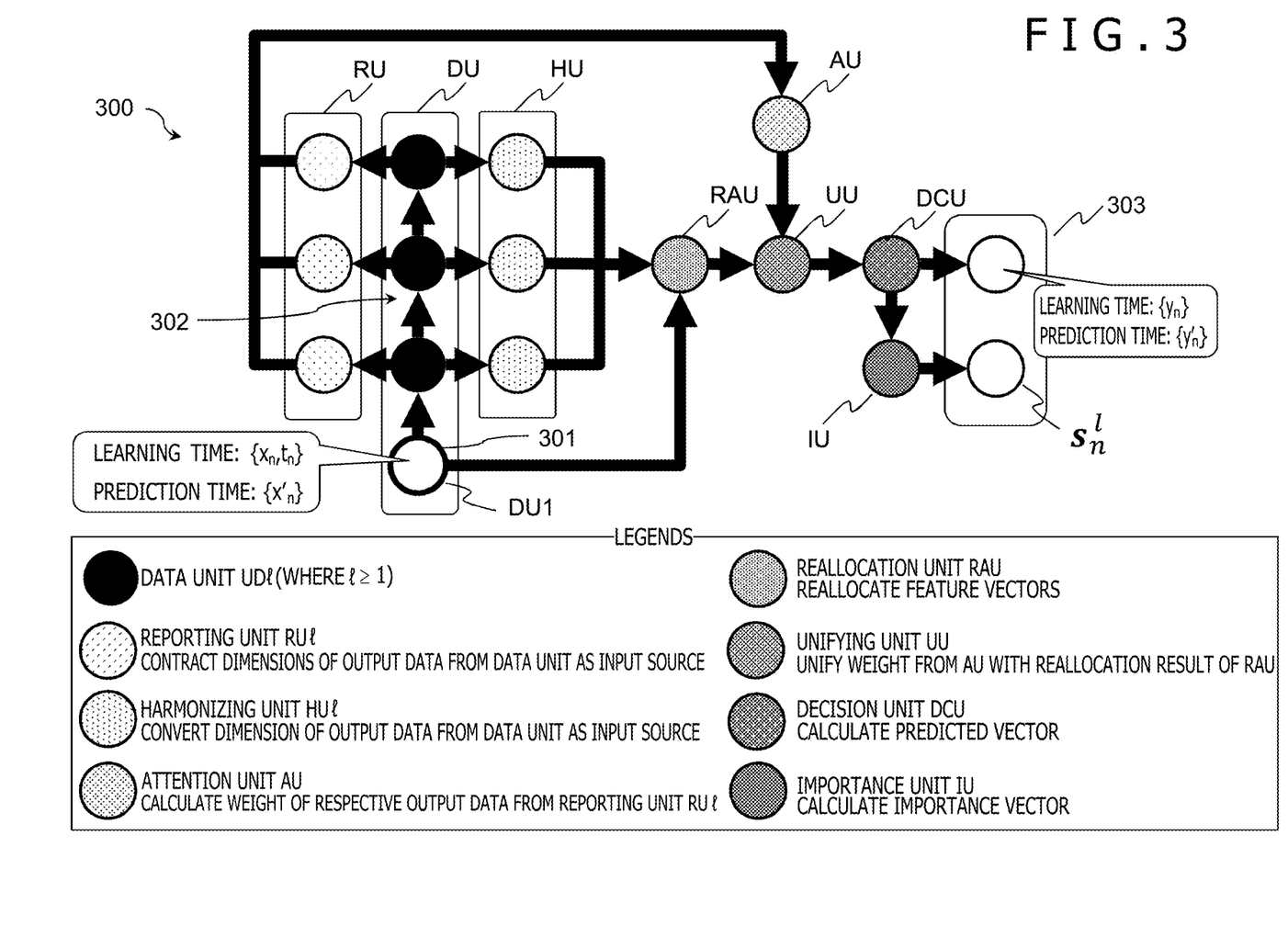
FIG. 3 is an explanatory diagram illustrating an example of a structure of a first neural network according to a first embodiment.

FIG. 3 is an explanatory diagram illustrating an example of a structure of a first neural network according to the first embodiment. The first neural network 300 has a data unit group DU, a reporting unit group RU, a harmonizing unit group HU, a reallocation unit RAU, a unifying unit UU, a decision unit DCU, and an importance unit IU.

The data unit group DU is configured such that a plurality of data units DUl (l is a hierarchical number and 1≤l≤L, where L is the hierarchical number of a lowest layer and L=4 in FIG. 1) are connected in series. The data unit DU1 that is a highest stage of l=1 corresponds to an input layer 301 of the first neural network 300 and the data units DUl of l≤2 correspond to intermediate layers (also referred to as "hidden layers") of the first neural network 300. Each data unit DUl is a perceptron to which output data from the data unit DU(l−1) of a previous stage is input, which performs calculation using a learning parameter of the own data unit DUl, and which outputs output data.

It is noted, however, that the data unit DUl retains training data at a time of learning by the learning section 261. The training data means herein, for example, sample data configured with a combination {$x_n$, $t_n$} of an image $x_n$ that is an example of the feature vector $x_n$ and a correct label $t_n$ (n=1, 2, ..., N, where N is the number of images). The image $x_n$ is data having a two-dimensional matrix structure and dealt with as a d-dimensional vector (where d is an integer satisfying d≥1) obtained by raster scanning. For easier description, in a case of designating "x," it is assumed that the vector is a one-dimensional vector obtained by raster scanning the image $x_n$ in a matrix form.

The correct label $t_n$ is a K-dimensional vector that indicates a type (for example, animal such as dog or cat) in a one-hot representation with respect to the number of types K of the images $x_n$. In the one-hot representation, a certain element of a vector corresponds to the type of the image $x_n$, 1.0 is stored in only one element, and 0.0 is stored in all the other elements. The type (for example, dog) corresponding to the element storing 1.0 is a correct type. It is noted that in a case in which a medical image $x_n$ such as a CT image, an MRI image, or an ultrasound image is an input, the label $t_n$ is a true value that represents a type of disease or a prognosis (good or bad) of a patient.

It is assumed that an image $x_n \in R^d$ ($R^d$ is a d-dimensional real number) is a feature vector configured with the d-dimensional real number $R^d$. A function $h^{l+1}_D$ that indicates the data unit DU(l+1) is expressed by the following Equation (1).

[Formula 1]

$$h_D^{l+1} = f_D^l(W_D^l h_D^l) \qquad (1)$$

where $h_D^l \in \mathcal{R}^{d^l}$ is input/output vector of data unit
$W_D^l \in \mathcal{R}^{d^{l+1} \times d^l}$ is learning parameter
when l=1, $h_D^1 = x_n$ In Equation (1), an index l (integer satisfying 1≤l≤L) denotes the hierarchical number (the same applies to the following equations). L is an integer equal to or greater than 1 and denotes a deepest hierarchical number. In addition, $f_D^l$ on a right side is an activation function. As the activation function, any of various activation functions such as a sigmoid function, a hyperbolic tangent function (tanh function), and an ReLU (Rectified Linear Unit) function may be used. A matrix $W_D^l$ is a learning parameter of the data unit DUl. A vector $h_D^l$ on the right side is an input vector input to the data unit DUl, that is, an output vector from the data unit DUl of the previous stage. It is noted that an output vector $h_D^l$ from the data unit DUl in a case in which the number of layers l=1 is $h_D^1 = x_n$.

It is noted that the data unit DUl retains the image $x_n$ that is the feature vector as the test data at a time of prediction by the prediction section 262.

An output vector $h_D^l$ from the data unit DUl on the same hierarchy is input to the reporting unit RUl (2≤l≤L), and the reporting unit RUl contracts the number of dimensions of the output vector $h_D^l$. A function $h_R^l$ that indicates the reporting unit RUl is expressed by the following Equation (2).

[Formula 2]

$$h_R^l = \sigma(W_R^l h_D^l) \qquad (2)$$

In Equation (2), a matrix $W_R^l$ is a learning parameter of the reporting unit RUl. The d-dimensional output vector $h_D^l$ from the data unit DUl is contracted to an m-dimensional output vector $h_R^l$ by Equation (2). Further, σ is a sigmoid function.

Each harmonizing unit HUl (2≤l≤L) is provided between the data unit DUl and the reallocation unit RAU on each intermediate layer for each data unit DUl on the intermediate layer. Each harmonizing unit HUl converts the number of dimensions of each output data from the data unit DUl on the intermediate layer into the same size. Therefore, output data made to have the same number of dimensions by the harmonizing unit HUl is input to the reallocation unit RAU.

In other words, the output vector $h_D^l$ is input to the harmonizing unit HUl from the data unit DUl on the same hierarchy, and the harmonizing unit HUl converts the number of dimensions of the output vector $h_D^l$ into the same number of dimensions. A function $h_H^l$ that indicates the harmonizing unit HUl is expressed by the following Equation (3).

[Formula 3]

$$h_H^l = f_H(W_H^l h_D^l) \qquad (3)$$

where $W_H^l \in \mathcal{R}^{d^l \times d^l}$ is learning parameter

In Equation (3), a matrix $W_H^l$ is a learning parameter of the harmonizing unit HUl. The d-dimensional output vector $h_D^l$ from the data unit DUl is thereby converted into an m-dimensional output vector $h_H^l$. It is noted that m is a hyperparameter that determines the number of dimensions. Further, d and m may differ from d and m in the reporting unit RU1. Furthermore, $f_H$ is an activation function.

The attention unit AU calculates a weight α of each data unit DU1 using the output vector $h^l_R$ from each reporting unit RU1. A function α that indicates the attention unit AU is expressed by the following Equation (4).

[Formula 4]

$$\alpha = \text{softmax}(W_A h_R) \quad (4)$$

where $W_A \in \mathcal{R}^{(L-1) \times m}$ (m=r(L−1))

In Equation (4), a matrix $W_A$ is a learning parameter of the attention unit AU. A softmax function that is one type of activation function calculates a vector $h_R$ in dimensions equal to the number of layers (L=4 in an example of Equation (5) below). As indicated by the following Equation (5), a vector $h_R$ on the right side of Equation (4) is a vector obtained by stacking $h^l_R$ in a perpendicular direction.

[Formula 5]

$$h_R = [h_R^2; \ldots; h_R^L]$$
$$\text{example of } L = 4$$
$$h_R^2 = [0, 1, 0]$$
$$h_R^3 = [0, 0, 1]$$
$$h_R^4 = [1, 0, 0]$$
$$\Rightarrow h_R = \begin{bmatrix} 0 \\ 1 \\ 0 \\ 0 \\ 0 \\ 1 \\ 1 \\ 0 \\ 0 \end{bmatrix} \begin{matrix} \}h_R^2 \\ \\ \}h_R^3 \\ \\ \}h_R^4 \end{matrix} \quad (5)$$

Therefore, the matrix $W_A$ becomes a matrix of L rows by M columns (where M is the number of elements of a vector $h_R$). By adopting the softmax function to the attention unit AU, each element (a sum of all the elements is 1) of the vector $h_R$ with the number of layers being L represents the weight of the corresponding data unit DU1.

The reallocation unit RAU reallocates the feature vectors (images $x_n$) in the certain feature space to the other feature space. Specifically, as illustrated in FIG. 1, for example, the prediction model obtained by a feature vector group on the feature space SP1 can be nonlinear; thus, the reallocation unit RAU transfers the feature vector group to the feature space SP2 so that a linear prediction model can be obtained in the feature space SP2. A function $h^l_T$ that indicates the reallocation unit RAU is expressed by the following Equation (6).

[Formula 6]

$$h_T^l = f_T(h_H^l, x_n) \quad (6)$$

As a function $f_T$, an Hadamard product between the vectors, element addition, or the like can be used. In the present embodiment, the Hadamard product is used (refer to the following Equation (7)). In Equation (7), an Hadamard product between the output vector $h^l_H$ from the harmonizing unit HU1 and the feature vector $x_n$ is obtained.

[Formula 7]

$$h_T^l = h_H^l \odot x_n \quad (7)$$

The unifying unit UU unifies the output vector $h^l_T$ from the reallocation unit RAU with the output vector α from the attention unit AU. In other words, the unifying unit UU weights the output vector $h^l_T$ from the reallocation unit RAU with the output vector α from the attention unit AU. A function $h_U$ that indicates the unifying unit UU is expressed by the following Equation (8).

[Formula 8]

$$h_U = \sum_{k=1}^{L-1} \alpha[k] h_T^{k+1} \quad (8)$$

In Equation (8), α on the right side indicates an element (weight) in a k-th dimension of the output vector α of Equation (4).

The decision unit DCU decides on a predicted value $y_n$ and outputs the predicted value $y_n$ to an output layer 303. Specifically, for example, the decision unit DCU weights the output vector $h_U$ from the unifying unit UU with a weight vector $w_O$ that is one of the learning parameters and gives the resultant vector to the sigmoid function σ, thereby obtaining the predicted value $y_n$. A function $y_n$ that indicates the decision unit DCU is expressed by the following Equation (9). In Equation (9), t in $w_O^t$ means a transpose.

[Formula 9]

$$y_n = \sigma(w_O^t h_U) \quad (9)$$

The importance unit IU calculates an importance vector $s^l_n$ that indicates an importance of a feature on each layer of the neural network and outputs the importance vector $s^l_n$ to the output layer 303. A function $s^l_n$ that indicates the importance unit IU is expressed by the following Equation (10).

[Formula 10]

$$s_n^l = \alpha[l] f_T(w_O, h_H^l) \quad (10)$$

In Equation (10), α on the right side indicates an element (weight) on an l-th hierarchy of the output vector α of Equation (4). As the function $f_T$, an Hadamard product between the vectors, element addition, or the like can be used, similarly to Equation (6). In the first embodiment, the Hadamard product is used. In Equation (10), the importance vector $s^l_n$ is the Hadamard product between the weight vector $w_O$ and the output vector $h^l_H$ from the harmonizing unit HU1. The importance vector $s^l_n$ is an importance of the n-th feature vector (image) $x_n$ in the hierarchy l.

<Example of Functional Configuration of Data Analysis Apparatus 220>

Figure 4:
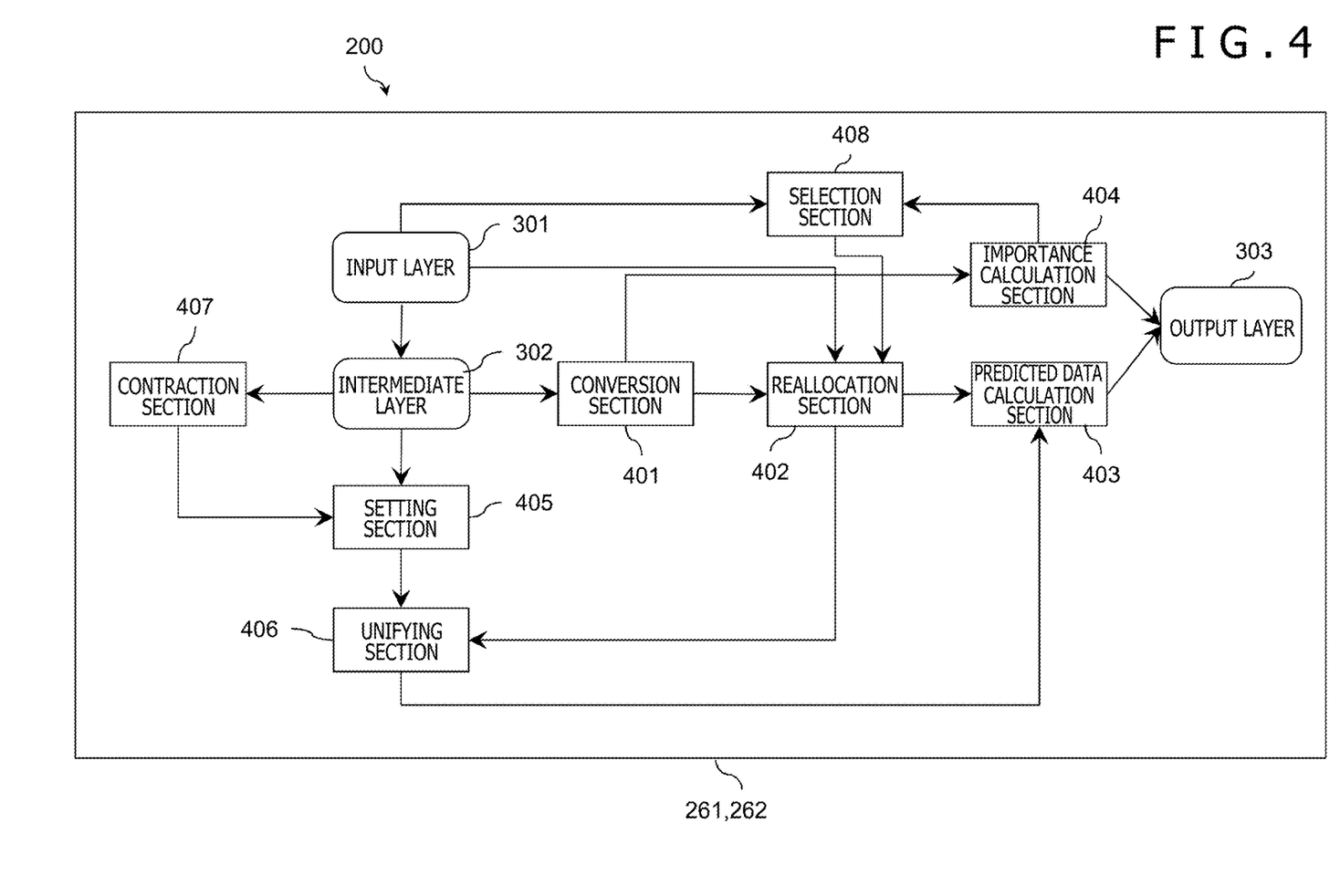
FIG. 4 is a block diagram illustrating an example of a functional configuration of a data analysis apparatus.

FIG. 4 is a block diagram illustrating an example of a functional configuration of the data analysis apparatus 220. The data analysis apparatus 220 has the input layer 301, intermediate layers 302, the output layer 303, a conversion section 401, a reallocation section 402, a predicted data calculation section 403, an importance calculation section 404, a setting section 405, a unifying section 406, a contraction section 407, and a selection section 408. These are an example of internal configurations of the learning section 261 and the prediction section 262. Since the selection section 408 is a constituent element in a second embodiment to be described later, the selection section 408 will be described later in the second embodiment.

As indicated by Equation (3), the conversion section 401 contracts the number of dimensions d of the output vector $h^l_D$ on the basis of the output vector $h^l_D$ from the DU1 (where l≥2) on each intermediate layer and the matrix $W^l_H$, and outputs the output vector $h^l_H$ after conversion. The conversion section 401 is the harmonizing unit group HU described above.

As indicated by Equations (6) and (7), the reallocation section 402 reallocates the feature vectors $x_n$ in the first feature space SP1 to the second feature space SP2 on the basis of the output vector $h_H^l$ after conversion from the conversion section 401 and the feature vector $x_n$ in the first feature space SP1 given to the input layer 301. The reallocation section 402 is the reallocation unit RAU described above.

As indicated by Equation (9), the predicted data calculation section 403 calculates a predicted vector $y_n$ with respect to each feature vector $x_n$ in the feature space SP1 on the basis of a reallocation result $h_T^l$ of the reallocation section 402 and the weight vector $w_O$. The predicted data calculation section 403 is the decision unit DCU described above.

As indicated by Equation (10), the importance calculation section 404 calculates the importance vector $s_n^l$ of the feature vector $x_n$ on each hierarchy l of the intermediate layers 302 on the basis of the output vector $h_H^l$ after conversion and the weight vector $w_O$. The importance calculation section 404 is the importance unit IU described above.

For example, as for the image $x_n$ that expresses an animal, it is assumed that an output vector $h_D^{la}$ on a certain hierarchy la is a feature that indicates whether a contour of a face is suitable for a cat and that an output vector $h_D^{lb}$ on a certain hierarchy lb ($\neq$la) is a feature that indicates whether a contour of an ear is suitable for a cat. In this case, referring to corresponding importance vectors $s_n^{la}$ and $s_n^{lb}$ enables the user to explain in the light of which feature of the face in the image $x_n$ the data analysis apparatus 220 discriminates the animal as a cat. For example, in a case in which the importance vector $s_n^{la}$ is low but the importance vector $s_n^{lb}$ is high, the user can explain that the data analysis apparatus 220 discriminates the animal as a cat in the light of a shape of the ear in the image $x_n$.

As indicated by Equations (4) and (5), the setting section 405 sets the weight α of each intermediate layer 302 on the basis of the output vector $h_D^l$ from the intermediate layer 302 and the matrix $W_A$. The setting section 405 is the attention unit AU described above.

As indicated by Equation (8), the unifying section 406 unifies the reallocation result $h_T^l$ with the weight α set by the setting section 405. The unifying section 406 is the unifying unit UU described above. In this case, the predicted data calculation section 403 calculates the predicted vector $y_n$ on the basis of a unifying result $h_U$ of the unifying section 406 and the weight vector $w_O$. Furthermore, the importance calculation section 404 calculates the importance vector $s_n^l$ on the basis of the weight α set by the setting section 405, the output vector $h_H^l$ after conversion, and the weight vector $w_O$.

As indicated by Equation (2), the contraction section 407 contracts the number of dimensions d of the output vector $h_D^l$ from each intermediate layer 302 on the basis of the output vector $h_D^l$ from the intermediate layer 302 and the matrix $W_R^l$, and outputs the output vector $h_R^l$ after contraction. The contraction section 407 is the reporting unit group RU described above. In this case, the setting section 405 sets the weight α of each intermediate layer 302 on the basis of the output vector $h_R^l$ after contraction from the contraction section 407 and the matrix $W_A$.

In a case in which the training data that includes the feature vector $x_n$ in the feature space SP1 and the correct label $t_n$ with respect to the predicted vector $y_n$ is given, the learning section 261 optimizes the matrix $W_D^l$ that is a first learning parameter, the matrix $W_H^l$ that is a second learning parameter, the weight vector $w_O$ that is a third learning parameter, the matrix $W_A$ that is a fourth learning parameter, and the matrix $W_R^l$ that is a fifth learning parameter using the predicted vector $y_n$ and the correct label $t_n$ in such a manner, for example, that a cross entropy between the correct label $t_n$ and the predicted value $y_n$ becomes a minimum.

The prediction section 262 sets the optimized learning parameters 265 to the first neural network 300 and gives a feature vector $x'_n$ as the test data to the input layer 301, thereby causing the predicted data calculation section 403 to calculate a predicted vector $y'_n$ in an extraction manner.

<Example of Data Analysis Processing Procedure>

Figure 5:
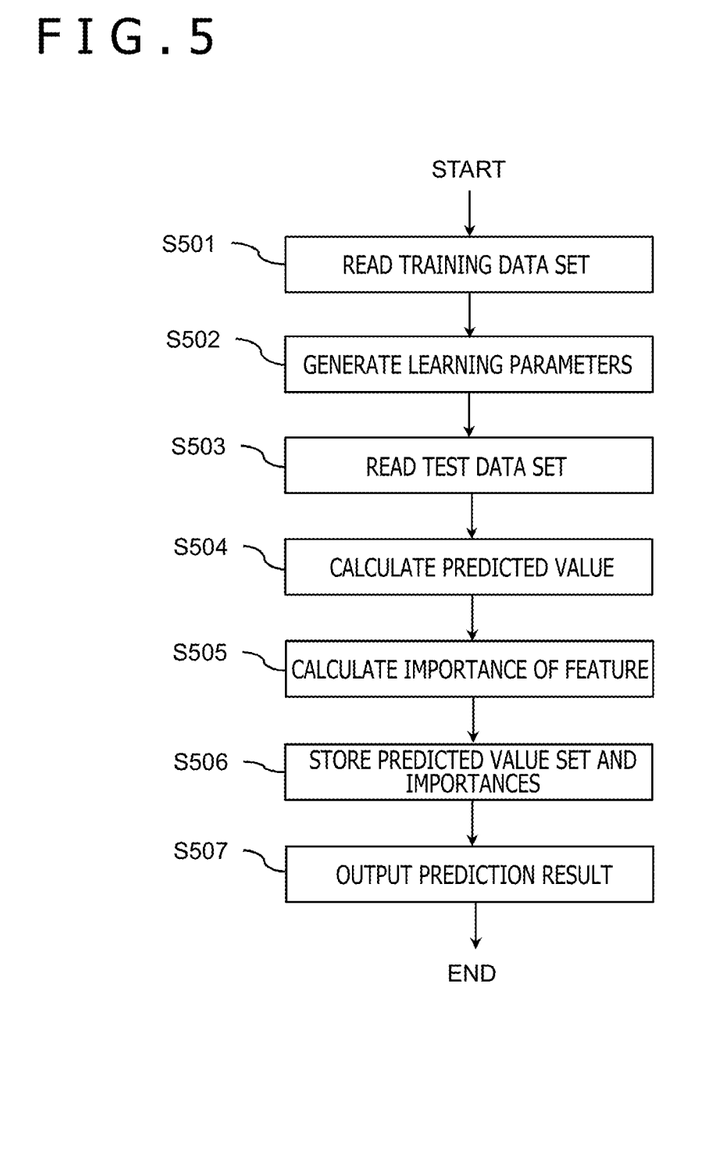
FIG. 5 is a flowchart illustrating an example of a data analysis processing procedure by the data analysis apparatus according to the first embodiment.

FIG. 5 is a flowchart illustrating an example of a data analysis processing procedure by the data analysis apparatus 220 according to the first embodiment. In FIG. 5, Steps S501 and S502 correspond to a learning process by the learning section 261 and Steps S503 to S507 correspond to the prediction process by th prediction section 262. First, the data analysis apparatus 220 reads the training data set 264 (Step S501).

The data analysis apparatus 220 performs learning by giving each training data $\{x_n, t_n\}$ to the first neural network 300, and generates the learning parameters 265 (matrices $W_D^l$, $W_R^l$, $W_H^l$, and $W_A$, and the weight vector $w_O$) (Step S502). In the learning (Step S502), the learning section 261 optimizes the learning parameters 265 by, for example, a statistical gradient method in such a manner that the cross entropy between the correct label $t_n$ and the predicted value $y_n$ becomes a minimum. The data analysis apparatus 220 stores the generated learning parameters 265 in the server DB 263.

Next, the data analysis apparatus 220 reads the test data set 252 (Step S503), gives each test data image $x'_n$ to the neural network in which the learning parameters 265 are already reflected, calculates the predicted value $y_n'$ by Equation (9) (Step S504), and calculates the importance vector $s_n^l$ of each image $x'_n$ by Equation (10) (Step S505).

Furthermore, the data analysis apparatus 220 stores the prediction result 253 that is a set of the predicted values $y_n'$ and the importance vectors $s_n^l$ (Step S506), and outputs the prediction result 253 to the client terminal 200 (Step S507). The client terminal 200 displays the prediction result 253 on the monitor 205.

In this way, according to the first embodiment, reallocating the feature vectors $x_n$ that are the sample data in advance makes it possible to calculate the importance of each feature even if the neural network is multi-layered, and to realize facilitation of an explanation per sample (feature vector $x_n$) with high accuracy and with efficiency. Moreover, since the linear prediction model is obtained by reallocating the samples (feature vectors $x_n$) in advance, it is possible to calculate the predicted value with high accuracy and with a low load at times of learning and prediction.

Second Embodiment

The second embodiment will be described. The second embodiment is an example of enhancing interpretability of the importance compared with the first embodiment, and uses the importance vector $s_n^l$ obtained in the first embodiment. It is noted that the same configurations as those in the first embodiment are denoted by the same reference characters and description thereof will be omitted.

<Example of Structure of Neural Network>

Figure 6:
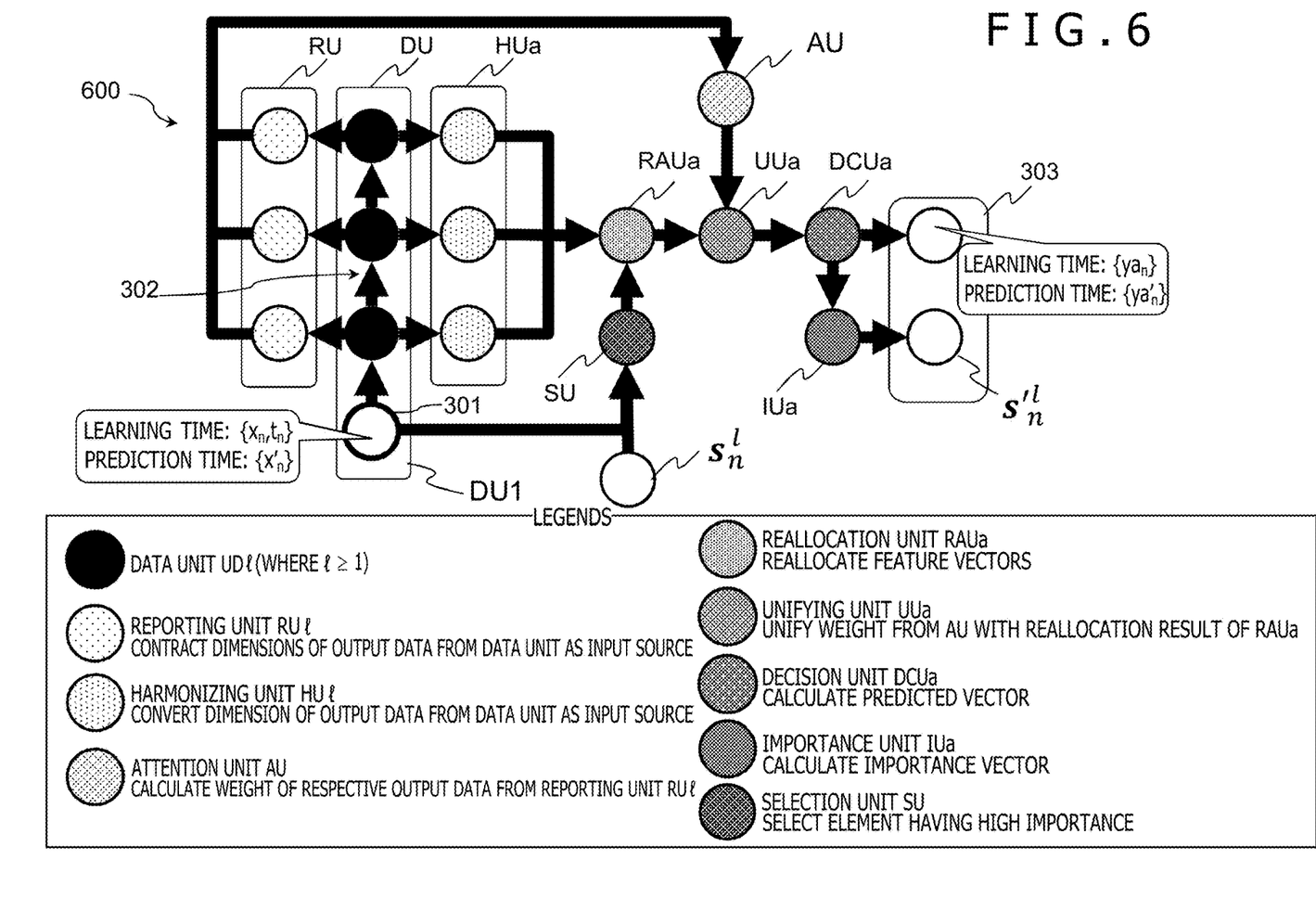
FIG. 6 is an explanatory diagram illustrating an example of a structure of a second neural network according to a second embodiment.

FIG. 6 is an explanatory diagram illustrating an example of a structure of a second neural network according to the second embodiment. A second neural network 600 has the data unit group DU, the reporting unit group RU, a selection unit SU, a harmonizing unit group HUa, a reallocation unit RAUa, a unifying unit UUa, a decision unit DCUa, and an importance unit IUa.

The selection unit SU calculates an average importance $s_{av} \in R^d$ for the importance vector $s_n^l$. A function $s_{av}$ that indicates the selection unit SU is expressed by the following Equation (11).

[Formula 11]

Since notation of $\bar{s}$ cannot be used in the specification, it is denoted by $Sav$.

$$s_{av} = \frac{1}{N(L-1)} \sum_{n=1}^{N} \sum_{l=2}^{L-1} s_n^l \qquad (11)$$

Each element of the average importance $s_{av}$ indicates an average importance of each feature for the number of hierarchies and the number of samples, and the data analysis apparatus selects v features (v is an arbitrary integer equal to or greater than 1), for each of which an absolute value of the average importance of the element is higher, from the feature vectors $x_n$, and generates a new v-dimensional feature vector $z_n \in R^d$.

Each harmonizing unit HUal ($2 \leq l \leq L$) is provided between the data unit DUl and the reallocation unit RAUa on each intermediate layer for each data unit DUl on the intermediate layer. The harmonizing unit HUal executes conversion of making the number of dimensions of each output data from the data unit DUl on the intermediate layer uniform. Therefore, output data made to have the number of dimensions of the same size by the harmonizing units HUal is input to the reallocation unit RAUa.

The output vector $h_D^l$ from the data unit DUl on the same hierarchy is input to the harmonizing unit HUal, and the harmonizing unit HUal converts the number of dimensions of the output vector $h_D^l$ into the same number of dimensions of the same size. A function $h_H^l$ that indicates the harmonizing unit HUal is expressed by the following Equation (12).

[Formula 12]

$$h_H^l = f_H(W_H^l h_D^l) \qquad (12)$$

where $W_H^l \in \mathcal{R}^{v \times d}$ is learning parameter

In Equation (12), the matrix $W_H^l$ is a learning parameter 265 of the harmonizing unit HUal. The d-dimensional output vector $h_D^l$ from the data unit DUl is thereby converted into an m-dimensional output vector $h_H^l$. Furthermore, $f_H$ is an activation function.

The reallocation unit RAUa reallocates the feature vectors (images $x_n$) in the certain feature space to the other feature space. Specifically, if the prediction model obtained by the feature vector group on the feature space SP1 is nonlinear as illustrated in, for example, FIG. 1, the reallocation unit RAUa transfers the feature vector group to the feature space SP2 so that a linear prediction model can be obtained in the feature space SP2. A function $h'^l_T$ that indicates the reallocation unit RAUa is expressed by the following Equation (13).

[Formula 13]

$$h'^l_T = f_T(h_H^l, z_n) \qquad (13)$$

As the function $f_T$, the Hadamard product between the vectors, the element addition, or the like can be used. In the present embodiment, the Hadamard product is used (refer to the following Equation (14)). In Equation (14), an Hadamard product between the output vector $h_H^l$ from the harmonizing unit HUal and a new feature vector $z_n$ from the selection unit SU is obtained.

[Formula 14]

$$h'^l_T = h_H^l \odot z_n \qquad (14)$$

The unifying unit UUa unifies the output vector $h'^l_T$ from the reallocation unit RAUa with the output vector $\alpha$ from the attention unit AU. In other words, the unifying unit UUa weights the output vector $h'^l_T$ from the reallocation unit RAUa with the output vector $\alpha$ from the attention unit AU. A function $h'_U$ that indicates the unifying unit UUa is expressed by the following Equation (15).

[Formula 15]

$$h'_U = \sum_{k=1}^{L-1} \alpha[k] h'^{k+1}_T \qquad (15)$$

In Equation (15), $\alpha$ on the right side indicates an element (weight) in the k-th dimension of the output vector $\alpha$ of Equation (4).

The decision unit DCUa decides on the predicted value $ya_n$. Specifically, for example, the decision unit DCUa weights the output vector $h'_U$ from the unifying unit UUa with a weight vector $w'_O{}^t$ that is one of the learning parameters 265 and gives the resultant vector to the sigmoid function $\sigma$, thereby obtaining a predicted value $ya_n$. A function $ya_n$ that indicates the decision unit DCUa is expressed by the following Equation (16). In Equation (16), t in $w'_O{}^t$ means a transpose.

[Formula 16]

$$ya_n = \sigma(w'_O{}^t h'_U) \qquad (16)$$

The importance unit IUa calculates an importance vector $s'^l_n$ that indicates an importance of a feature on each layer of the second neural network 600. A function $s'^l_n$ that indicates the importance unit IUa is expressed by the following Equation (17).

[Formula 17]

$$s'^l_n = \alpha[l] f_T(w'_O, h'_H^l) \qquad (17)$$

In Equation (17), $\alpha$ on the right side indicates an element (weight) on the l-th hierarchy of the output vector $\alpha$ of Equation (4). As the function $f_T$, the Hadamard product between the vectors, the element addition, or the like can be used, similarly to Equation (13). In the second embodiment, the Hadamard product is used. In Equation (17), the Hadamard product between the weight vector $w'_O$ and the output vector $h'^l_H$ from the harmonizing unit HUal is obtained.

<Example of Functional Configuration of Data Analysis Apparatus>

An example of a functional configuration of the data analysis apparatus 220 according to the second embodiment will next be described with reference to FIG. 4. Description of the same configurations as those in the first embodiment will be omitted. In the second embodiment, the selection section 408 is newly added. The selection section 408 calculates the importance vector $s_{av}$ of each element that configures the feature vector $x_n$ on the basis of the feature vector $x_n$ and the importance vector $s_n^l$, and selects part of elements from the feature vector $x_n$ on the basis of the importance vector $s_{av}$ to generate the feature vector $z_n$. The selection section 408 is the selection unit SU described above.

In this case, the conversion section 401 applies Equation (12), and the reallocation section 402 reallocates, as shown in Equation (13) and Equation (14), the feature vectors $z_n$ from the selection section 408 to the second feature space SP2 on the basis of the output vectors $h^l_H$ after conversion obtained by application of Equation (12) and the feature vectors $z_n$. Furthermore, the unifying section 405 applies Equation (15), the predicted data calculation section 403 applies Equation (16), and the importance calculation section 404 applies Equation (17).

<Example of Data Analysis Processing Procedure>

Figure 7:
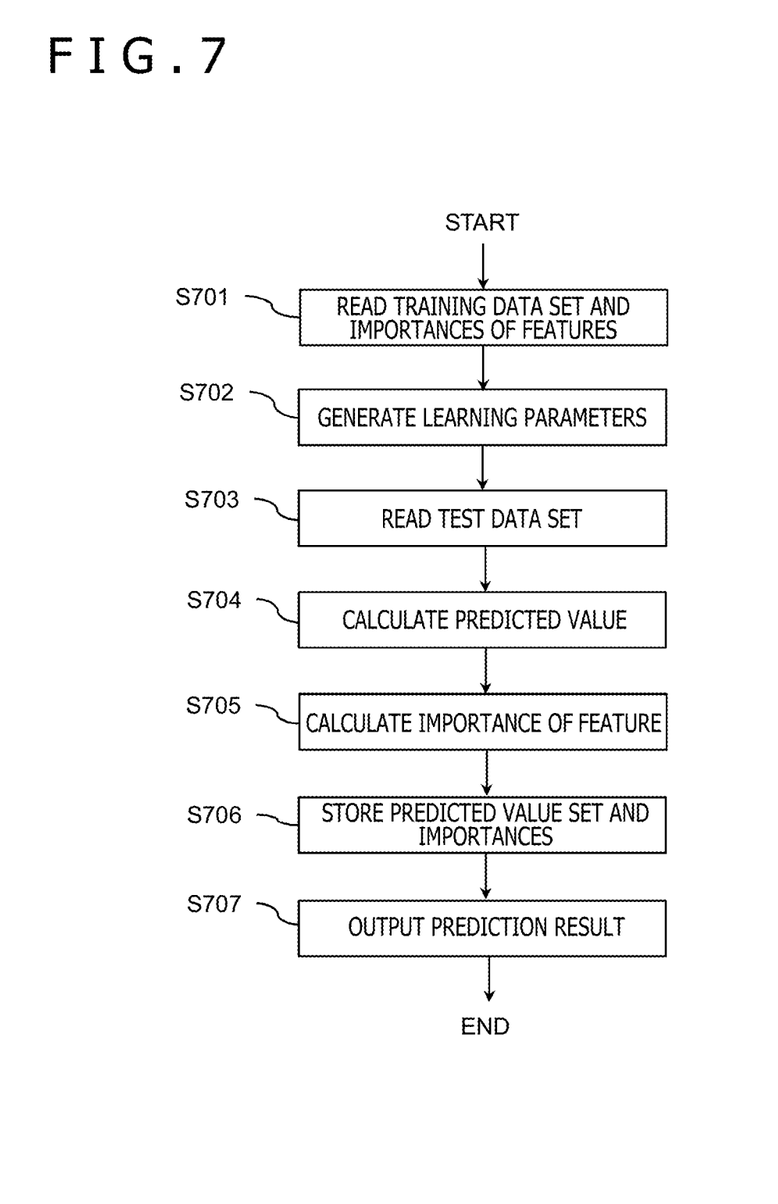
FIG. 7 is a flowchart illustrating an example of a data analysis processing procedure by a data analysis apparatus according to the second embodiment.

FIG. 7 is a flowchart illustrating an example of a data analysis processing procedure by the data analysis apparatus 220 according to the second embodiment. In FIG. 7, Steps S701 and S702 correspond to the learning process by the learning section 261 and Steps S703 to S707 correspond to the prediction process by the prediction section 262. First, the data analysis apparatus 220 reads the training data set 264 and importances of features (Step S701).

The data analysis apparatus 220 performs learning by giving each training data $\{x_n, t_n\}$ to the second neural network 600, and generates the learning parameters 265 (matrices $W^l_D$, $W^l_R$, $W^{l}_H$, and $W_A$, and the weight vector $w^l_O$) (Step S702). In the learning (Step S702), the learning section 261 optimizes the learning parameters 265 by, for example, the statistical gradient method in such a manner that the cross entropy between the correct label $t_n$ and the predicted value $y_n$ becomes a minimum. The data analysis apparatus 220 stores the generated learning parameters 265 in the server DB 263.

Next, the data analysis apparatus 220 reads the test data set 252 (Step S703), gives each image $x'_n$ of the test data to the neural network in which the learning parameters 265 are already reflected, calculates the predicted value $ya'_n$ by Equation (16) (Step S704), and calculates the importance vector $s'^l_n$ of each image $x'_n$ by Equation (17) (Step S705).

Furthermore, the data analysis apparatus 220 stores the prediction result 253 that is a set of predicted values $ya'_n$ and the importance vectors $s'^l_n$ (Step S706), and outputs the prediction result 253 to the client terminal 200 (Step S707). The client terminal 200 displays the prediction result 253 on the monitor 205.

In this way, according to the second embodiment, carefully selecting the feature vectors $z_n$ that are sample data of the elements having the higher importances from among the feature vectors $x_n$ that are sample data makes it possible to obtain the importances $s^l_n$ and $s'^l_n$ for the hierarchies l of the carefully selected feature vectors $z_n$, and to enhance the interpretability of the importances $s^l_n$ and $s'^l_n$, compared with the first embodiment. Moreover, similarly to the first embodiment, the linear prediction model is obtained by reallocating the samples (feature vectors $z_n$) in advance; thus, it is possible to calculate the predicted value with high accuracy and with a low load at times of learning and prediction.

Third Embodiment

A third embodiment will be described. In the third embodiment, an example of predicting Boston house prices to show that the data analysis apparatus 220 can handle information other than the image data and an approach classified into regression. A performance validation was conducted by data used in Non-Patent Document 3 mentioned below.

<Non-Patent Document 3>

Used in Belsley, Kuh & Welsch, 'Regression diagnostics . . . ', Wiley, 1980. N.B. Various transformations are used in the table on pages 244-261.

Figure 8:
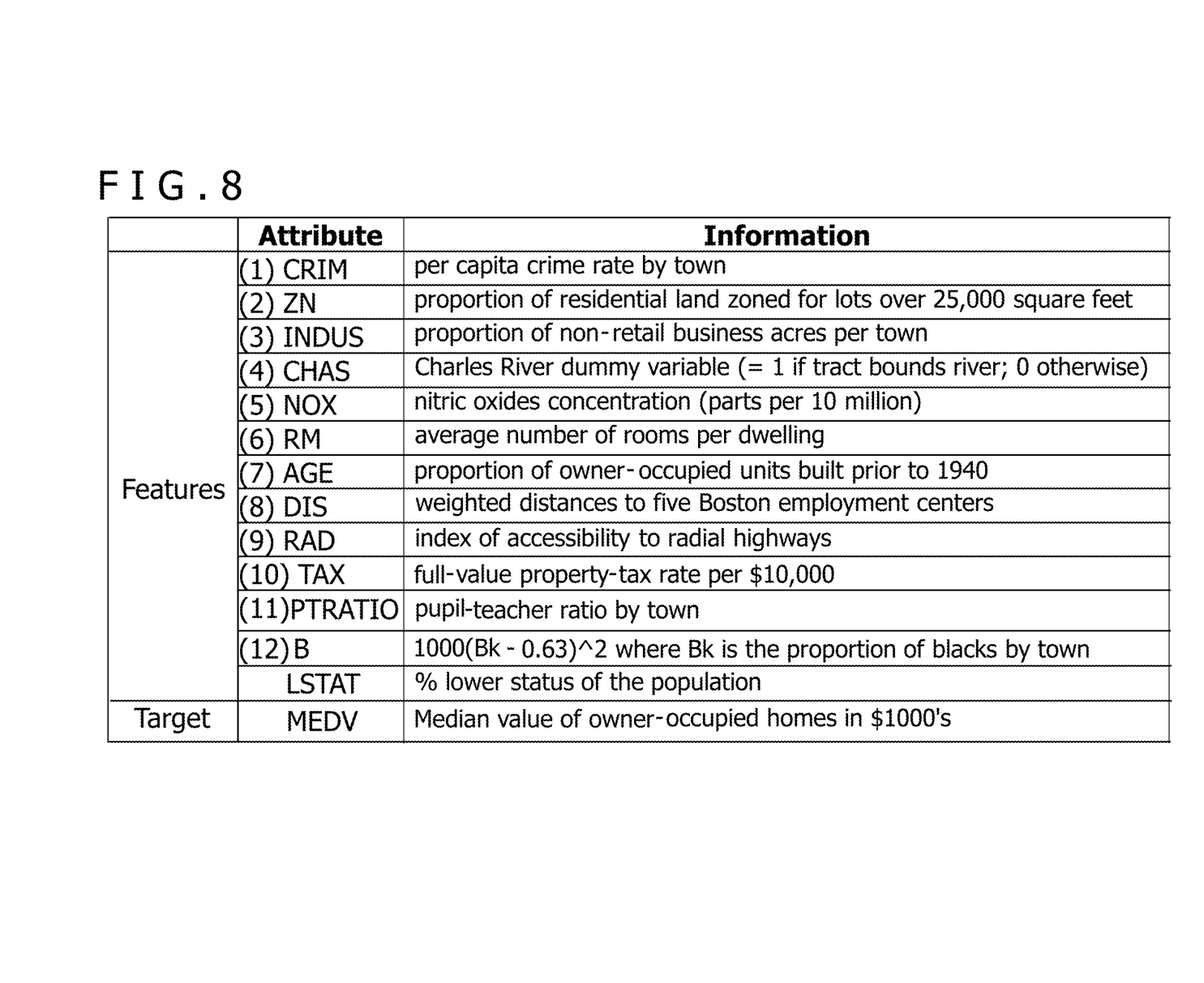
FIG. 8 is an explanatory diagram illustrating feature vectors Features and correct data Target.

FIG. 8 is an explanatory diagram illustrating feature vectors Features and correct data Target. In an experiment, using 10-fold cross validation, evaluation was conducted as follows. A. The first embodiment was applied in a case of only four factors ((1) to (4) (CRIM, ZN, INDUS, and CHAS). B. The first embodiment was applied in a case of using all factors (1) to (13). C. The second embodiment was applied in a case in which the feature vectors $z_n$ of the second embodiment were the four factors (1) to (4) (CRIM, ZN, INDUS, and CHAS) and in which the feature vectors $x_n$ of the first embodiment were the 13 factors (1) to (13). For A to C, the evaluation was conducted on a scale of determinant coefficients $r^2$ ($r^2$=0.0 to 1.0). Because of a regression problem, calculation methods of the decision units DCU and DCUa were changed to the following Equations (18) and (19), respectively.

[Formula 18]

$$y_n = w_O^t h_U \qquad (18)$$

$$y'_n = w'^t_O h'_U \qquad (19)$$

It should be noted that only the sigmoid function is eliminated in Equations (18) and (19). The learning section 261 optimizes the learning parameters 265 described above in such a manner that a square error between the correct label $t_n$ and the predicted value $y_n$ or $y'_n$ becomes a minimum by the statistical gradient method.

Figure 9:
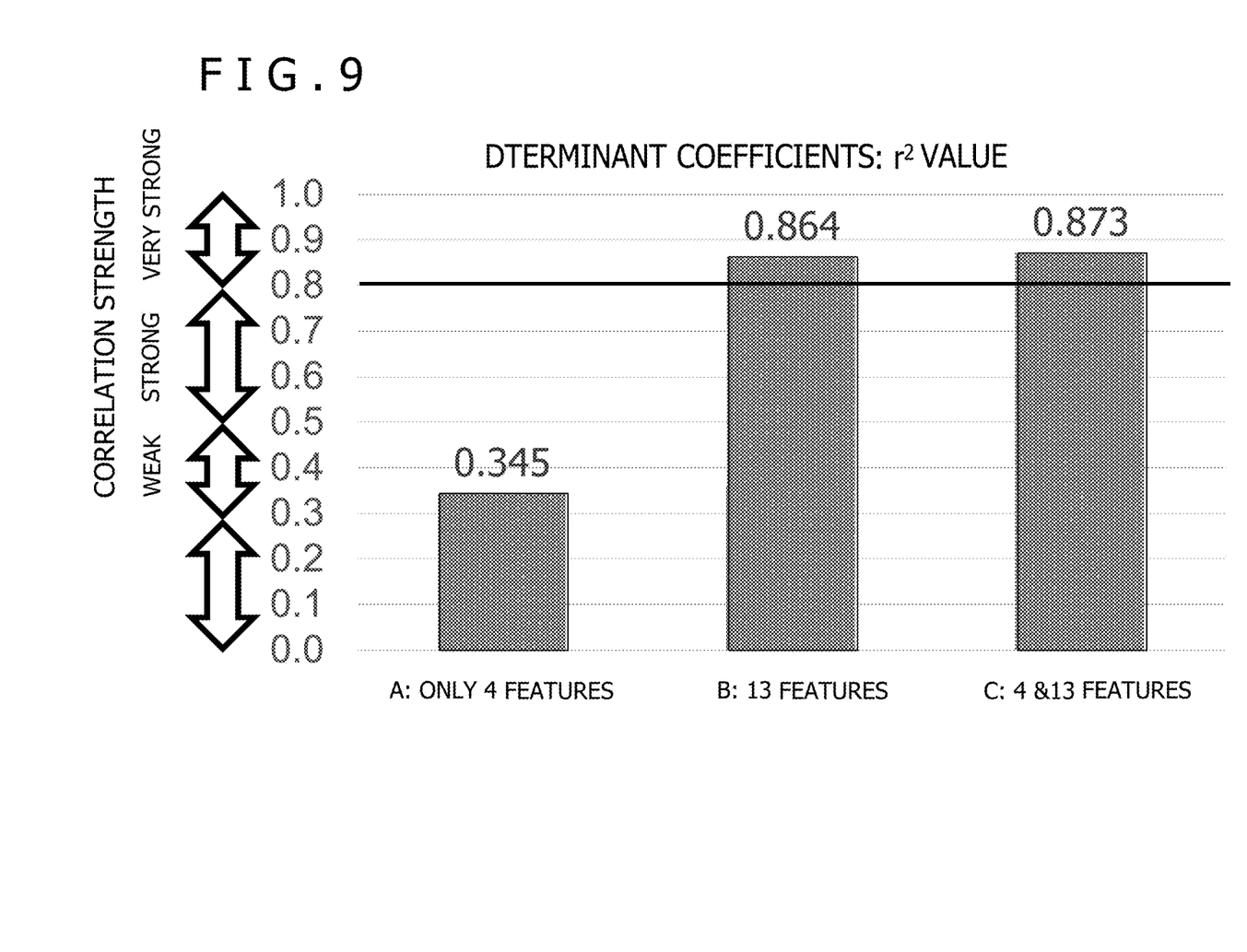
FIG. 9 is an explanatory diagram illustrating an experimental result.

FIG. 9 is an explanatory diagram illustrating an experimental result. Since results of B and C indicate that the determinant coefficients $r^2$ exceeded 0.8, it was possible to make predictions with strong correlations according to the first and second embodiments, respectively. According to the second embodiment, in particular, the best result was obtained that the determinant coefficients $r^2$=0.873.

The present invention is not limited to the embodiments described above but encompasses various modifications and equivalent configurations within a scope of the spirit of the accompanying claims. For example, the abovementioned embodiments have been described in detail for describing the present invention so that the present invention is easy to understand, and the present invention is not always limited to the embodiments having all the described configurations. Furthermore, a part of the configurations of a certain embodiment may be replaced by configurations of another embodiment. Moreover, the configurations of another embodiment may be added to the configurations of the certain embodiment. Further, for part of the configurations of each embodiment, addition, deletion, or replacement may be made for the other configurations.

As described so far, according to the embodiments described above, the data analysis apparatus 220 has the conversion section 401, the reallocation section 402, and the importance calculation section 404. Therefore, the linear prediction model is obtained by reallocating the feature vectors ($x_n$, $x'_n$) in advance; thus, it is possible to calculate the predicted value with high accuracy and with a low load at times of learning and prediction. Furthermore, it is possible to grasp features possessed by the feature vectors ($x_n$, $x'_n$) by the importance for every hierarchy l from the importance calculation section 404. It is thereby possible to realize facilitation of an explanation about the feature vectors ($x_n$, $x'_n$) given to the neural network as an object to be analyzed with high accuracy and with efficiency.

Moreover, the data analysis apparatus 220 has the predicted data calculation section 403; thus, it is possible to realize facilitation of an explanation about the reason for obtaining the prediction results ($y_n$, $y'_n$) from the neural network as an object to be analyzed with respect to the feature vectors ($x_n$, $x'_n$) with high accuracy and with efficiency.

Furthermore, the data analysis apparatus 220 has the setting section 405 and the unifying section 406; thus, the predicted data calculation section 403 can calculate the prediction result based on the reallocation result with high accuracy.

Moreover, the data analysis apparatus 220 has the contraction section 407; thus, it is possible to improve efficiency of the data analysis.

Furthermore, the data analysis apparatus 220 can construct a high accuracy prediction model by learning by the learning parameters 265.

Moreover, the data analysis apparatus 220 has the selection section 408; thus, carefully selecting the feature vectors $z_n$ that are the elements having the higher importances from among the feature vectors $x_n$ makes it possible to enhance the interpretability of the importances $s'^l_n$, $s'^{l'}_n$.

Moreover, apart of or all of each of the configurations, the functions, the processing sections, processing means, and the like described above may be realized by hardware by being designed, for example, as an integrated circuit, or may be realized by software by causing a processor to interpret and execute programs that realize the functions.

Information in a program, a table, a file, and the like for realizing the functions can be stored in a storage device such as a memory, a hard disc, or an SSD (Solid State Drive), or in a recording medium such as an IC (Integrated Circuit) card, an SD card, or a DVD (Digital Versatile Disc).

Furthermore, control lines or information lines considered to be necessary for the description are illustrated and all the control lines or the information lines necessary for implementation are not always illustrated. In actuality, it may be contemplated that almost all the configurations are mutually connected.

DESCRIPTION OF REFERENCE CHARACTERS

2: data analysis system
200: client terminal
220: data analysis apparatus
252: test data aggregate
253: prediction result
261: learning section
262: prediction section
264: training data set
265: learning parameter
300: first neural network
301: input layer
302: intermediate layer
303: output layer
401: conversion section
402: reallocation section
403: predicted data calculation section
404: importance level calculation section
405: setting section
406: unifying section
407: contraction section
408: selection section
600: second neural network
AU: attention unit
DCU: decision unit
DU: data unit group
HU: harmonizing unit group
RAU: reallocation unit
RU: reporting unit group

The invention claimed is:

1. A data analysis apparatus comprising:
a processor;
an input device; and
a memory comprising a main storage device, an auxiliary storage device, and a transportable storage medium, wherein each of the main storage device, auxiliary storage device, and transportable storage medium stores a first neural network and learning parameters of the first neural network,
wherein the processor is configured to:
construct the first neural network configured with an input layer, an output layer, and two or more intermediate layers which are provided between the input layer and the output layer, wherein each of the input layer, output layer, and intermediate layers is further configured to:
perform a calculation by sending data from a layer of a previous stage and a first learning parameter to a first activation function and output a calculation result vector to a layer of a subsequent stage, wherein the calculation result vector is output data, and
convert a number of vectorial dimensions of output data from each of the intermediate layers into a number of vectorial dimensions of the same size on the basis of the output data and a second learning parameter such that the converted output data from each of the intermediate layers has the same number of vectorial dimensions;
reallocate first input data in a first feature space given to the input layer to a second feature space on the basis of the converted output data and the first input data in the first feature space;
calculate a first importance vector of the first input data in each of the intermediate layers on the basis of the respective output data after conversion and a third learning parameter;
calculate a second importance vector of each element that configures the first input data on the basis of the first input data and the first importance vector;
generate second input data by selecting part of elements from the first input data on the basis of the second importance vector; and
reallocate the second input data to the second feature space on the basis of the converted output data and the second input data.

2. The data analysis apparatus according to claim 1, wherein the processor is further configured to:
calculate predicted data with respect to the first input data in the first feature space on the basis of a reallocation result of the reallocation section and the third learning parameter.

3. The data analysis apparatus according to claim 2, wherein the processor is further configured to:
adjust the first learning parameter, the second learning parameter, and the third learning parameter using the predicted data; and correct data with respect to the predicted data in a case of being given training data including the first input data in the first feature space and the correct data.

4. The data analysis apparatus according to claim 2, wherein the processor is further configured to:
   set a weight of each of the intermediate layers on the basis of the output data from each of the intermediate layers and a fourth learning parameter; and
   unify the reallocation result with the weight set by the setting section, wherein the processor:
   calculates the predicted data on the basis of a unifying result of the unifying section and the third learning parameter, and
   calculates the first importance vector on the basis of the weight set by the setting section, the respective output data after conversion, and the third learning parameter.

5. The data analysis apparatus according to claim 4, wherein the processor is further configured to:
   contract the number of vectorial dimensions of the respective output data on the basis of output data from each of the intermediate layers and a fifth learning parameter, wherein
   set the weight of each of the intermediate layers on the basis of the respective contracted output data and the fourth learning parameter.

6. A data analysis method causing a data analysis apparatus to execute:
   a construction process that constructs a first neural network configured with an input layer, an output layer, and two or more intermediate layers which are provided between the input layer and the output layer, wherein each of the input layer, output layer, and intermediate layers is further configured to perform a calculation by sending data from a layer of a previous stage and a first learning parameter to a first activation function and output a calculation result vector to a layer of a subsequent stage, wherein the calculation result vector is output data, and;
   a conversion process that converts a number of vectorial dimensions of output data from each of the intermediate layers into a number of vectorial dimensions of the same size on the basis of the output data and a second learning parameter and outputs converted output data;
   a reallocation process that reallocates first input data in a first feature space given to the input layer to a second feature space on the basis of the converted output data from the conversion process and the first input data in the first feature space;
   an importance calculation process that calculates a first importance vector of the first input data in each of the intermediate layers on the basis of the converted output data and a third learning parameter; and
   a selection process that calculates a second importance vector of each element that configures the first input data on the basis of the first input data and the first importance vector, and that generates second input data by selecting part of elements from the first input data on the basis of the second importance vector, wherein the second input data is reallocated to the second feature space on the basis of the converted output data and the second input data.

* * * * *